United States Patent [19]

Tasaki et al.

[11] Patent Number: 5,174,025
[45] Date of Patent: Dec. 29, 1992

[54] METHOD OF MANUFACTURING A HUB FOR A SPINDLE MOTOR

[75] Inventors: Shigeru Tasaki; Hisayoshi Ohashi; Shinobu Hirono, all of Kyoto, Japan

[73] Assignee: Nippon Densan Corporation, Kyoto, Japan

[21] Appl. No.: 660,288

[22] Filed: Feb. 22, 1991

[30] Foreign Application Priority Data

Sep. 1, 1990 [JP] Japan ................... 2-231837

[51] Int. Cl.⁵ ............................................. B21K 1/40
[52] U.S. Cl. ............................. 29/894.362; 29/894.36
[58] Field of Search .............. 29/894, 894.36, 894.362, 29/892; 72/333, 335, 348

[56] References Cited

U.S. PATENT DOCUMENTS

| 1,410,093 | 3/1922 | Dallmeyer et al. | 29/894.362 |
| 1,850,395 | 3/1932 | Hughes | 29/894.362 |
| 4,741,194 | 5/1988 | Kozyra et al. | 29/894 |

FOREIGN PATENT DOCUMENTS

| 123422 | 9/1901 | Fed. Rep. of Germany | 29/892 |
| 694787 | 12/1930 | France | 29/894 |
| 8948 | 1/1980 | Japan | 29/894.36 |

Primary Examiner—P. W. Echols
Attorney, Agent, or Firm—McCormick, Paulding & Huber

[57] ABSTRACT

A spindle motor for rotating a recording medium. A hub having an end wall portion, a cylindrical portion extending from the end wall portion, and a flange extending from the cylindrical portion radially outwardly is formed by forging, drawing or ironing. The recording medium is placed on the flange portion.

5 Claims, 12 Drawing Sheets

METHOD OF MANUFACTURING A HUB FOR A SPINDLE MOTOR

BACKGROUND OF THE INVENTION

This invention relates to a spindle motor for rotating a recording medium and a method of manufacturing a hub of the spindle motor.

Spindle motors have been put to wide practical use as motors for rotating recording mediums including magnetic disks or the like. In general, this kind of spindle motor has a housing mounted on a frame or the like of a drive unit, and a hub rotatable relative to the housing. In the case of a fixed shaft type, the shaft is fixed to the housing and the hub is rotatably attached to the fixed shaft with bearing members interposed therebetween. In the case of a rotating shaft type, the shaft is rotatably attached to the housing with bearing members interposed therebetween, and the hub is fixed to the rotating shaft. The recording medium, e.g., a magnetic disk is attached to the hub in a desired way.

However, in the conventional motors of this kind, the hub is manufactured by die casting or machining, and the following problems are therefore encountered.

In the case of forming the hub by die casting, cavities are formed easily and it is difficult to make the casting surface uniform because of occurrence of contamination or the like on the surface depending upon die casting conditions. Also, primary working is required to enable the cast piece to be used as a hub. (It is necessary to machine, after die casting, the cast piece at a position where a high degree of dimensional accuracy is required.) In addition, it is very difficult for the corner of the hub at which the cylindrical portion and the flange portion are connected to be made substantially perpendicular; a curved portion is left between these portions, which makes it difficult to attach the recording medium to the hub securely and substantially horizontally. Conventionally, such a curved portion is removed by machining but machining this portion entails the problem of generation of chips or the like.

On the other hand, in the case of forming the hub by machining, the amount of machining is considerably large, the manufacture cost is increased and it is difficult to improve the productivity.

SUMMARY OF THE INVENTION

A main object of the present invention is to provide a spindle motor having a hub which can be manufactured with accuracy comparatively easily.

Another object of the present invention is to provide a method which enables a hub to be easily manufactured with improved accuracy in a mass production manner.

Other objects and features of the present invention will be understood from the following description.

BRIEF DESCRIPTION OF THE DRAWINGS

FIGS. 4-A to 4-I are schematic diagrams of a process of manufacturing the hub in accordance with the first embodiment;

DESCRIPTION OF THE PREFERRED EMBODIMENTS

The present invention will be described below in detail with reference to the accompanying drawings.

First Embodiment

Figure 2:
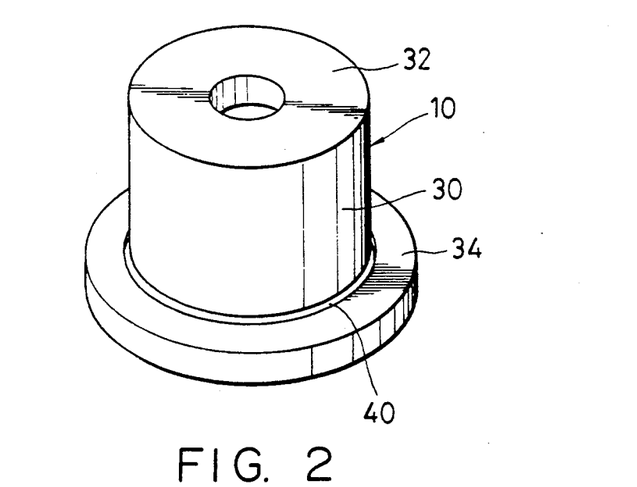
FIG. 2 is a perspective view of the hub of the spindle motor shown in FIG. 1.
Figure 3:
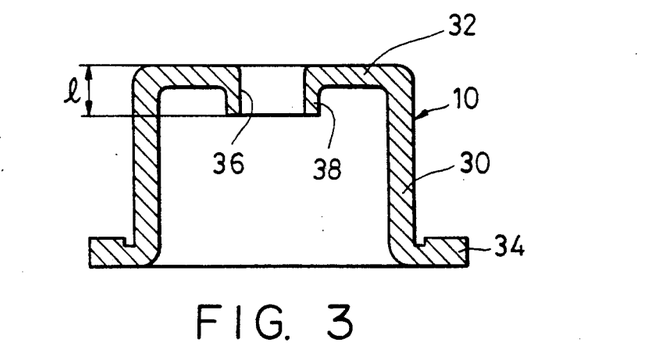
FIG. 3 is a cross-sectional view of the hub shown in FIG. 2.

A spindle motor in accordance with the first embodiment of the present invention will be described below with reference to FIGS. 1 to 3.

Figure 1:
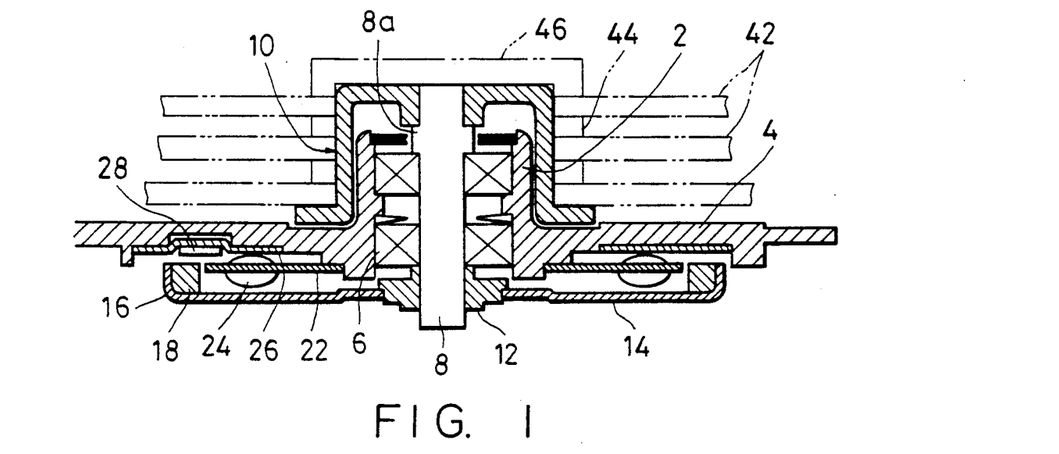
FIG. 1 is a cross-sectional view of a spindle motor in accordance with a first embodiment of the present invention.

The motor shown in FIG. 1 has a hollow cylindrical housing 2, and an attachment bracket 4 which is formed integrally with the housing 2 and which extends radially outwardly from the outer circumferential surface of the housing 2. The attachment bracket 4 is attached to a frame of a drive unit (not shown). A rotating shaft 8 is rotatably supported by a pair of bearing members 6 in the housing 2. A hub 10, which will be described later, is fixed to one end of the rotating shaft 8. A bush member 12 is fixed to the other end of the rotating shaft 8, and a rotor holder 14 in the form of a generally flat circular plate is attached to the bush member 12. An annular wall 16 is formed on the outer circumferential end of the rotor holder 14 so as to project on the housing 2 side. Rotor magnets 18 are attached to the inner circumferential surface of the annular wall 16. A stator 20 is attached to the attachment bracket 4. The stator 20 has a stator core 22 extending to a position in the vicinity of the inner circumferential surfaces of the rotor magnets 18, and armature coils 24 wound around portions of the stator core 22. A printed circuit board 26 is attached to a surface (a lower surface as viewed in FIG. 1) of the attachment bracket 4. A Hall element 28 for controlling the rotation of the hub 10 is provided on the printed circuit board 26 at a predetermined position.

The hub 10 will be described below with reference to FIGS. 2 and 3 as well as FIG. 1. The hub 10 has a hollow cylindrical portion 30, an end wall portion 32 formed at one end of the cylindrical portion 30 (at the upper end as viewed in FIGS. 1 to 3), and a flange portion 34 projecting radially outwardly at the other end of the cylindrical portion 30 (at the lower end as viewed in FIGS. 1 to 3). A circular hole 36 is formed in the end wall portion 32 substantially at the center thereof. The hole 36 is defined by the end wall portion 32 and an annular projection 38 extending inwardly from the end wall portion 32. An annular recess 40 rectangular in section is formed in a portion connecting the other end of the cylindrical portion 30 and the inner circumferential end of the flange portion 34.

In this example of the hub 10, the cylindrical portion 30 extends from the outer circumferential end of the end wall portion 32 substantially perpendicularly, and the flange portion 34 extends from the other end of the cylindrical portion 30, i.e., the free end outwardly and substantially perpendicularly. As shown in FIG. 1, recording mediums 42 such as magnetic disks are fitted around the outer circumferential surface of the cylindrical portion 30 of the hub 10 and are pinched between the flange portion 34 of the hub 10 and a clamp member 46 fixed to the end wall portion 32 of the hub 10 (or the rotating shaft 8) by a bolt (not shown), with annular spacers 44 interposed between the recording mediums 42 to maintain the same at predetermined intervals.

For prevention of eccentric motion, whirling or the like of the recording mediums 42 during rotation, it is preferable to fix the hub 10 to the rotating shaft sufficiently firmly. In this embodiment, the inwardly projecting annular projection 38 is provided on the end wall portion 32, and the end wall portion 32 and the annular projection 38 are fixed to one end of the rotating shaft 8 by means of press fitting or the like. The surfaces of the hub 10 and the rotating shaft 8 contacting each other are therefore sufficiently long in the axial direction of the rotating shaft 8, so that the hub 10 can be fixed sufficiently firmly. To fix the hub 10 in this manner, it is preferable to set the distance l between the end surface of the end wall portion 32 and the free end surface of the annular projection 38 to 4 mm or greater.

Preferably, the recording mediums 42 are rotated substantially horizontally. In this embodiment, an end surface of a shoulder portion 8a of the rotating shaft 8 is worked so as to extend straight and substantially perpendicularly to the axis of rotation of the rotating shaft 8, the free end surface of the annular projection of the hub 10 is worked to be made substantially flat, and the end surface of the shoulder portion 8a and the free end surface of the annular projection 38 are brought into abutment against each other. The cylindrical portion 30 of the hub 10 therefore extends substantially parallel to the axis of rotation mentioned above and the recording mediums 42 attached to the cylindrical portion 30 extend substantially perpendicularly to the same axis of rotation, so that the recording mediums 42 are rotated substantially horizontally.

The annular recess 40 is formed at the position mentioned above so that the recording medium 42 at the lowest position can be firmly supported on the flange portion 34 of the hub 10. The provision of the recess 40 formed for this purpose ensures that the recording mediums 42 are placed on the flange portion 34 substantially horizontally and are firmly pinched, as can be understood from FIGS. 1 to 3. The formation of the recess 40 will be described later in more detail.

Method of manufacturing the hub in accordance with the first embodiment

Figure 4:
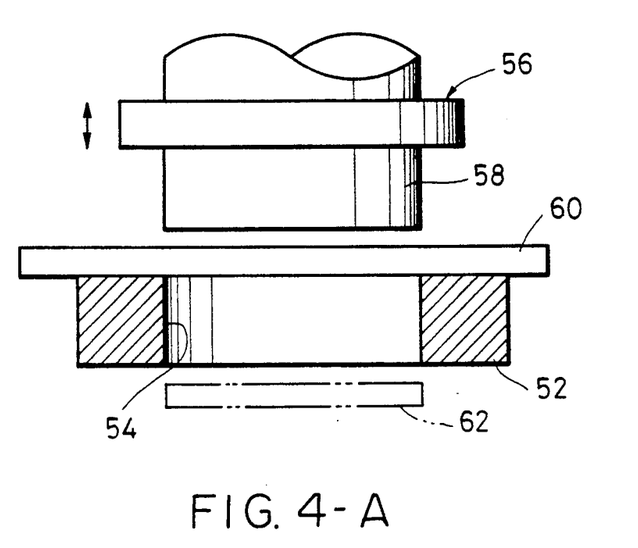
Figures 1, 4:
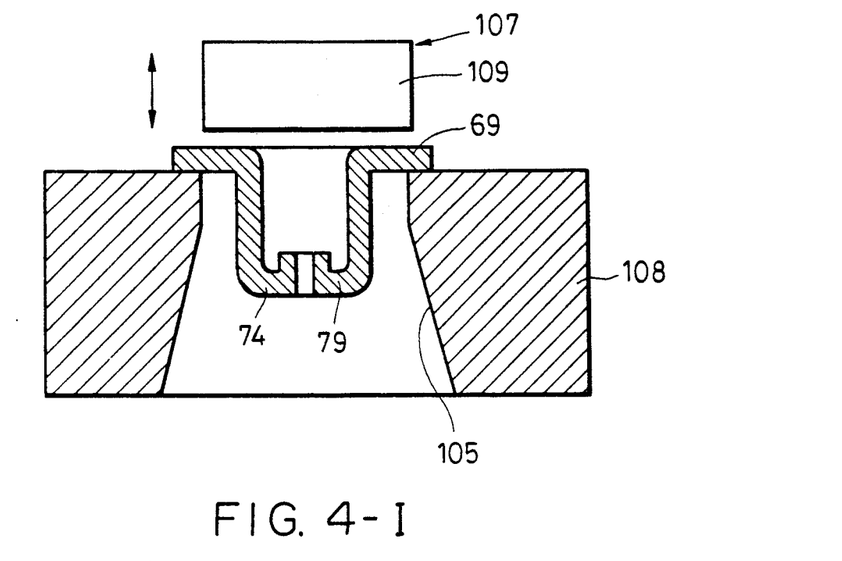

The above-described hub 10 is formed as desired by working steps shown in FIGS. 4-A to 4-I.

The first step shown in FIG. 4-A is a blank punching step. A circular through hole 54 is formed in a lower die 52. An upper die has a punch 58 having an outside diameter corresponding to the inside diameter of the through hole 54. In the first step, a sheet member 60 is positioned on the lower die 52 and, in this state, the upper die 56 is moved vertically in the direction of each of the arrows. A portion of the sheet member 60 is punched by the operation of the lower die 52 and the punch 58 to form a circular plate member 62 (blank). As the sheet member 60, a sheet of aluminum or an aluminum alloy, or an iron member such as a cold-rolled steel plate can suitably be used. The thickness of the sheet member 60 may be about 2 mm.

The second step shown in FIG. 4-B, the third step shown in FIG. 4-C and the fourth step 4-D constitute a drawing or ironing process. Holes 66a, 66b, and 66c for defining the outer circumferential surface of the cylindrical portion 30 when the hub 10 is formed are formed in lower dies 64a, 64b, and 64c. Punches 70a, 70b, and 70c of upper dies 68a, 68b, and 68c have predetermined shapes such as to define the inner circumferential surface of the cylindrical portion 30. In the second, third and fourth steps, the punches 70a, 70b, and 70c act on the plate member 62 (an intermediate work piece 72 formed by working the plate member 62 by drawing or ironing) by the vertical movements of the upper dies 68a, 68b, and 68c, and drawing or ironing is effected by the cooperation of the punches 70a, 70b, and 70c and the lower dies 64a, 64b, and 64c. An intermediate work 74 such as that shown in FIG. 4-D to be worked into the hub is thereby formed from the circular plate member 62. As the drawing or ironing process proceeds, the work piece is worked so that the portion to be formed as the cylindrical portion 30 of the hub 10 is reduced in thickness and elongated, as can be understood from FIGS. 4-B to 4-D. That is, if the amount of working of drawing or ironing is large, the number of drawing or ironing steps such as those described above is increased. To improve the accuracy with which the intermediate work 74 is formed, it is desirable to add a forming step which is known per se.

The fifth step shown in FIG. 4-E is a recess forming step. A lower die 71 has a shape corresponding to the shape of the inner portion of the intermediate work 74 formed as described above. An annular punch 75 for forming the recess is formed at the lower end of an upper die 73, and a cylindrical recess 77 is formed in the upper die 73 inside the punch 75 so as to accommodate the cylindrical portion of the intermediate work 74. The inside diameter of the punch 75 substantially corresponds to the outside diameter of the cylindrical portion of the intermediate work 74. The punch 75 acts on a base end portion of a flange portion 69 of the intermediate work 74. In this recess forming step, the intermediate work 74 is fitted around the upper portion of the lower die 71 with its end wall portion 79 located at the top thereof. In this state the upper die 73 is moved vertically. The punch 75 thereby strikes against the base portion of the flange portion 69 of the intermediate work 74 to form annular recess 40 in the base portion while removing a curved portion from the base portion, thereby enabling the recording mediums 42 to be placed on the flange portion substantially horizontally.

The sixth step shown in FIG. 4-F is a burring/hole-forming step. A lower die 76 has a shape corresponding to the shape of the inner portion of the intermediate work 74, and has a through hole 78 formed at its center. An upper die 80 is moved vertically in the direction of each of the arrows. The upper die 80 has a punch 82 having an outside diameter corresponding to the inside diameter of the through hole 78. In the burring/hole-forming step, the intermediate work 74 is fitted around the upper portion of the lower die 76 with its end wall portion 79 located at the top thereof. In this state the upper die 80 is moved vertically. A central portion of the end wall 79 of the intermediate work 74 is punched by the punch 82, thereby forming a hole 84 in the end wall 79.

The seventh step shown in FIG. 4-G is a burring step. A lower die 86 has a shape corresponding to the shape of the inner portion of the intermediate work 74, and has a cylindrical recess 88 formed in its central upper-end portion. An upper die 90 has a punch 92 having an outside diameter slightly larger than the inside diameter of the hole 84 of the intermediate work 74. In this burring step, the intermediate work 74 is fitted around the upper portion of the lower die 86 and, in this state, the upper die is moved vertically. The punch 92 thereby acts on the portion of the intermediate work 74 defining the hole 84 so that this portion is extruded downward as viewed in FIG. 4-G, thereby forming inwardly extending annular projection 38 on the inner surface of the end wall 79. To prevent the annular projection 38 from extending radially outwardly, it is desirable to make the inner circumferential surface of the lower die 86 defining the recess 88 define the outer circumferential surface of the annular projection 38 formed by burring. By this burring, the portion fixed on the rotary shaft 8 can have a sufficiently large length and can be formed easily.

The eighth step shown in FIG. 4-H is an impacting step. A lower die 96 has a large-diameter recess 98 having a shape corresponding to the shape of the intermediate work 74, and has a small-diameter recess 100 formed at central bottom portion of the large-diameter recess 98. An upper die 102 has an impact punch 104. A cylindrical projection 106 is formed on a central end portion of the punch 104. The lower end surface of the punch 104 is substantially flat, and the outside diameter of the projection 106 corresponds to the inside diameter of the hole 84 of the end wall 79 after burring. In the impacting step, the intermediate work 74 is accommodated in the large-diameter recess of the lower die 96 with its end wall 79 located at the bottom thereof. In this state the free end surface of the annular projection 38 formed on the intermediate work 74 is impacted by the lower end surface of the punch 104. The free end surface of the annular projection 38 is thereby made flat while a predetermined degree of horizontality thereof is maintained. The desired degree of horizontality of the hub 10 attached to the rotating shaft 8 and, hence, that of the recording mediums 42 can therefore be maintained. At the time of impacting, the projection 106 is positioned inside the hole 84 of the intermediate work 74 to prevent the annular projection 38 from being deformed radially inwardly, so that the inside diameter of the hole 84 of the intermediate work 74 is not substantially changed when this impacting is effected and that the hub 10 can be firmly fixed to the rotating shaft 8.

The ninth step shown in FIG. 4-I is a trimming step. A circular through hole 105 is formed in a lower die 108. A lower portion of the through hole 105 is gradually extended radially outwardly at a lower position. The inside diameter of the through hole 105 corresponds to the outside diameter of the flange portion 34 of the hub 10 shown in FIGS. 2 and 3. An upper die 107 has a trimming punch 109. The outside diameter of the trimming punch 109 corresponds to the inside diameter of the through hole 105 of the lower die 108. In the trimming step, the flange portion 69 of the intermediate work 74 is retained on the upper surface of the lower die 108 with the end wall 79 located in the through hole 105. In this state the upper die 107 is moved vertically, and the intermediate work 74 is punched by the cooperation of the upper die 107 and the lower die 108 to obtain the hub 10 shown in FIGS. 2 and 3 while leaving an annular portion on the lower die 108.

Thus, the hub 10 having the annular recess 40 is formed through the steps of drawing or ironing, burring, impacting and trimming.

The hub 10 thus formed is machined at a particular position alone if necessary to be used as the hub 10 of the spindle motor shown in FIG. 1. Thus, the hub 10 can be formed by a process including substantially no amount of machining. Even if machining is effected, the amount of machining is very small in comparison with the prior art, thereby solving the problem of chips or the like.

In the first embodiment, the recess forming step is executed after the drawing or ironing step (i.e., before the burring/hole-forming step). Alternatively, the recess forming step may be executed after the burring step or the impacting step.

Second Embodiment

A spindle motor in accordance with the second embodiment will be described below with reference to FIG. 5. The fundamental constituents of the second embodiment are substantially equal to those of the first embodiment and will therefore be described schematically.

Figure 5:
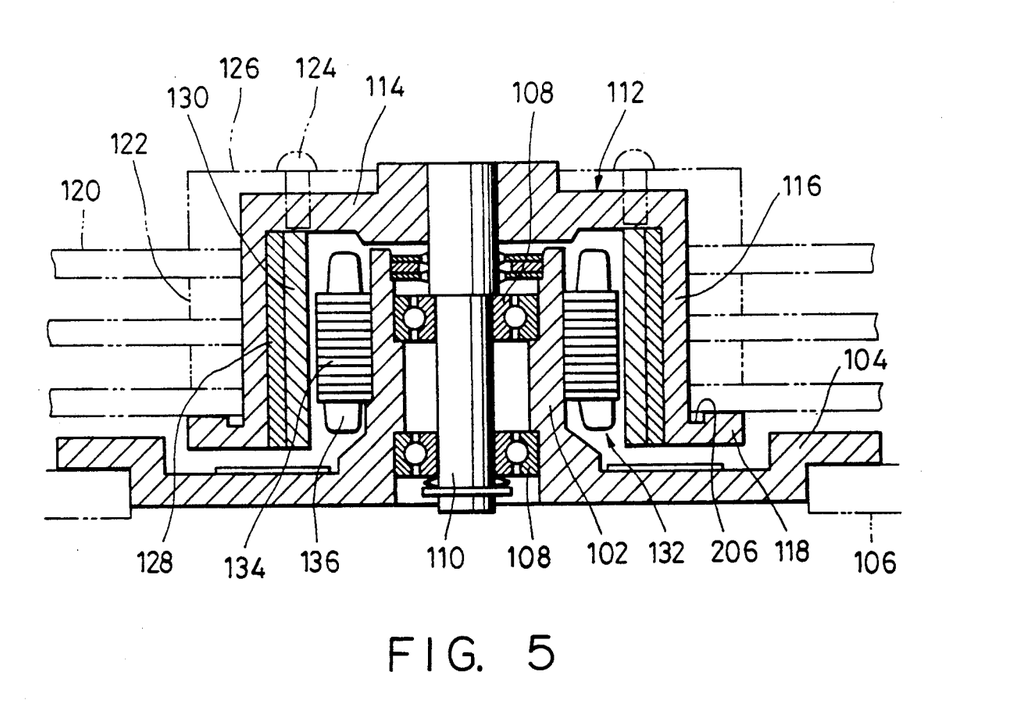
FIG. 5 is a cross-sectional view of a spindle motor in accordance with a second embodiment of the present invention.

The motor shown in FIG. 5 has a hollow cylindrical housing 102, and an attachment bracket 104 provided on the housing 102 is attached to a frame 106 of a drive unit. A rotating shaft 110 is rotatably supported by a pair of bearings members 108 in the housing 102.

A hub 112 is fixed to one end (upper end) of the rotating shaft 110. The hub 112 has a wall end portion 114, a cylindrical portion 116 extending from the outer circumferential end of the end wall portion 114 substantially perpendicularly, and a flange portion 118 projecting radially outwardly from the free end of the cylindrical portion 116. The end wall portion 114 is fixed to the rotating shaft 110. As shown in FIG. 5, recording mediums 120 are placed on the flange portion 118 of the hub 112, and a spacer member 122 is interposed between each pair of adjacent recording mediums 120. A clamp member 126 is attached to the end wall portion 114 of the hub 112 by screwing fixing screws 124, thereby pinching the recording mediums 120 between the flange portion 118 and the clamp member 126.

Rotor magnets 130 are attached to the inner circumferential surface of the cylindrical portion 116 of the hub 112 with a yoke member 128 interposed therebetween. A stator 132 is disposed so as to face the rotor magnets 130. The stator 132 has a stator core 134 attached to an outer circumferential surface of the housing 102, and coils 136 wound around stator core 134 portions. When a predetermined current is supplied to the coils 136, the hub 112 and the recording mediums 120 (rotating shaft 110, rotor magnets 130) are rotated in a predetermined direction relative to the housing 102 (stator 132).

Method of manufacturing the hub in accordance with the second embodiment

Figure 6:
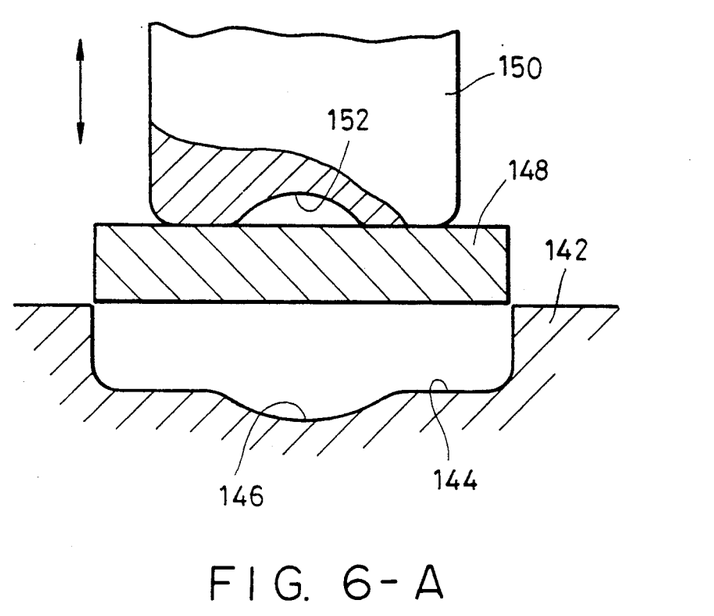
FIGS. 6A to 6G are schematic diagrams of a process of manufacturing the hub in accordance with the second embodiment.

The hub 112 is formed as desired by the working steps shown in FIGS. 6-A to 6-G.

FIGS. 6-A and 6-B show a state of a blank before the working of the first step and a state during the working. A generally cylindrical recess 144 is formed in a lower die 142, and an arched recess 146 is formed at a central bottom portion of the recess 144. A blank 148 to be worked is in the form of a short cylinder and may be formed of, for example, S20C or S45C carbon steel. The inside diameter of the recess 144 is substantially equal to the outside diameter of the blank 148. The blank 148 is positioned in the recess 144 of the lower die 142 when worked. An upper die 150 is cylindrical and has an outside diameter smaller than the inside diameter of the recess 144 of the lower die 142. The upper die 150 is moved vertically as indicated by the arrows. An arched recess 152 is formed in an end surface of the upper die 150. The upper die 150 is moved downward to forge the blank 148 so that the end wall portion 114 is defined by the end surface of the upper die 150 and the bottom surface of the recess 144 of the lower die 142 while the cylindrical portion 116 is defined by the outer circumferential surface of the upper die 150 and the inner circumferential surface of the recess 144 of the lower die 142, thereby forming a first intermediate work 154 as shown in FIG. 6-B.

The second and third steps shown in FIGS. 6-C and 6-D are also forging steps similar to the first step. A recess 158 for defining the outer surface of the hub 112 is formed in a lower die 156 used in the second step, and a working projection 162 for defining the inner surface of the hub 112 is formed in an upper die 160. Further, a gap for defining the flange portion 118 of the hub 112 is provided between the lower and upper dies 156 and 160. The structure of lower and upper dies 164 and 166 used in the third step is basically equal to that of the lower end upper dies 156 and 160 of the second step. That is, the lower die 164 has a recess 168 for defining the outer surface of the hub 112, the upper die 166 has a working projection 170 for defining the inner surface of the hub 112, and a gap for defining the flange portion 118 of the hub 112 exists between these dies. In the second step, the first intermediate work 154 is forged and, in the third step, a second intermediate work 172 worked in the second step is further forged to form a final intermediate work 174. The shape of the final intermediate work 174 is generally equal to that of the hub 112 provided as the assembly part. The final intermediate work 174 undergoes the following auxiliary working to form the hub 112. As can be easily understood from FIGS. 6-B and 6-D, the intermediate work is worked so that as the working process proceeds, the portion to be formed as the end wall portion 114 of the hub 112 is reduced in thickness, the portion to be formed as the cylindrical portion 116 is reduced in thickness while being increased in length, and the portion to be formed as the flange portion 118 projects radially.

If the amount of forging is large or if the shape of the hub 112 is complicated, the number of forging steps may be increased. If there is a need for a further improvement with which the intermediate work is formed, a forming step may be added after the third step.

The fourth step shown in FIG. 6-E is a hole forming step. A recess 180 having a shape corresponding to the shape of the intermediate work 174 is formed in a lower die 178, and an ejection through hole 182 extending downward is formed in a portion of the lower die 178 corresponding to a central bottom portion of the recess 180. An upper die 184 is moved vertically in the direction of each of the arrows. A cylindrical punch 186 is provided at the lower end of the upper die 184. In the hole forming step, the intermediate work 174 is positioned in the recess 180 of the lower die 178 with its end wall portion 175 located at the bottom thereof. In this state the upper die 184 is moved vertically, and a central portion of the end wall portion 175 of the intermediate work 174 is punched with the punch 186. A hole 188 for fixing the rotating shaft 110 is thereby formed in the end wall portion 175.

The fifth step shown in FIG. 6-F is an auxiliary forging step. A cylindrical projection 192 is formed on the upper end of a lower die 190. The outside configuration of the cylindrical projection corresponds to the inner surface configuration of the intermediate work 174. A recess 196 corresponding to the outer surface configuration of the intermediate work 174 is formed in an upper die 194. A plurality of conical projections 198 are provided on the bottom surface of the recess 196 at predetermined intervals. (For example, six projections 198 are arranged by being spaced apart from each other in the circumferential direction.) An annular punch 200 for forming the hub recess is provided at the circumferential end of the upper die 194 defining the recess 196. In the auxiliary forging step, the intermediate work 174 is placed so as to be fitted around the cylindrical projection 192 of the lower die 190 with the end wall portion 175 located at the top thereof. In this state the upper die 194 is moved vertically, and the conical projections 198 of the upper die 194 act on the outer surface of the end wall portion 175, while the annular punch 200 acts on a base end portion of the flange portion 177, thereby forming small recesses 202 for forming female thread portions in the end wall portion 175, as well as an annular recess 206 in the flange portion 177. By the formation of the annular recess 206, a curved base end portion of the flange portion 177 is removed so that recording mediums 120 can be placed on the flange portion 177 substantially horizontally.

The sixth step shown in FIG. 6-G is a trimming step. A circular through hole 210 is formed in a lower die 208. The inside diameter of the through hole 210 corresponds to the outside diameter of the flange portion 177 of the hub 112. An upper die 212 serves as a trimming punch, and the outside diameter of the upper die 212 corresponds to the inside diameter of the through hole 210. In the trimming step, the flange portion 177 of the intermediate work 174 is supported on the upper surface of the lower die 208 with the end wall portion 175 located at the bottom thereof. In this state the upper die 212 is moved vertically, and the intermediate work 174 is punched by the cooperation of the upper die 212 and the lower die 208 to obtain hub 112 such as that shown in FIG. 5 while leaving an annular portion of the work on the lower die 208. After this punching, the small recesses formed in the end wall portion 175 of the hub 112 are worked to form threaded holes.

Thus, the hub 112 shown in FIG. 5 is formed through the forging step, the hole forming step, the auxiliary forging step and the trimming step. The hub 112 thus formed may be machined at a particular position alone if necessary to be used as the hub 112 of the spindle motor shown in FIG. 5.

Example of modification of the hub manufacture method

In the second embodiment, the hub 112 and the rotating shaft 110 are formed separately and are thereafter fixed to each other. Alternatively, the hub and the rotating shaft may be integrally formed by forging.

Figure 7:
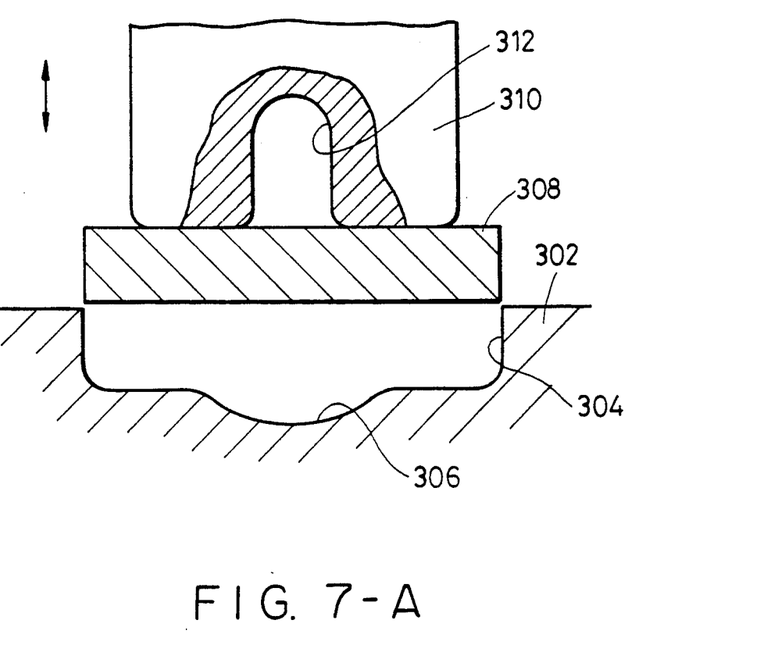
FIGS. 7A to 7D are schematic diagrams of an example of a modification of the process of manufacturing the hub in accordance with the second embodiment.

FIGS. 7-A to 7-D show a process of manufacturing the hub integrally with the shaft.

FIGS. 7-A and 7-B show a state of a blank before the working of the first step and a state during the working. A generally cylindrical recess 304 is formed in a lower die 302, and an arched recess 306 is further formed in the lower die 302 at a central bottom portion of the recess 304. A blank 308 to be worked is in the form of a short cylinder and may be the same as that of the second embodiment. The inside diameter of the recess 304 is substantially equal to the outside diameter of the blank 308. The blank 308 is positioned in the recess 304 of the lower die 302 when worked. An upper die 310 is cylindrical and has an outside diameter smaller than the inside diameter of the recess 304 of the lower die 302. The upper die 310 is moved vertically as indicated by the arrows. A recess 312 extending upward as viewed in FIG. 7-A and having a circular cross section is formed in an end surface of the upper die 310. The upper die 310 is moved downward to forge the blank 308 so that the end wall portion 114 is defined by the end surface of the upper die 310 and the bottom surface of the recess 306 of the lower die 302 while the cylindrical portion 116 is defined by the outer circumferential surface of the upper die 310 and the inner circumferential surface of the recess 306 of the lower die 302. Further, a shaft portion (corresponding to the rotating shaft 110) extending from the end wall portion 114 is formed by the recess 312 of the upper die 310, thereby forming a first intermediate work 314.

The second and third steps shown in FIGS. 7-C and 7-D are also forging steps. A recess 320 (322) for defining the outer surface of the hub 112 is formed in a lower die 316 (318) used in the second (third) step, and a working projection 328 (330) for defining the inner surface of the hub 112 is formed in an upper die 324 (326). Further, a gap for defining the flange portion 118 of the hub 112 is provided between the lower die (316 (318) and the upper die 324 (326). In the second step, the first intermediate work 314 is forged and, in the third step, a second intermediate work 334 worked in the second step is further forged to form a final intermediate work 336. As can be easily understood from FIGS. 7-B and 7-D, the intermediate work is worked so that as the working process proceeds, the portion to be formed as the end wall portion 114 of the hub 112 is reduced in thickness, the portion to be formed as the cylindrical portion 116 and the portion to be formed as the shaft portion (corresponding to the rotating shaft 110) are reduced in thickness while being increased in length, and the portion to be formed as the flange portion 118 projects radially.

The final intermediate work 336 thus formed can be used as a hub having a shaft portion in place of the hub 112 and the rotating shaft 110 shown in FIG. 5. The final intermediate work 336 is worked by the auxiliary forging step shown in FIG. 6-F and the trimming step shown in FIG. 6-G, as in the case of the second embodiment. Further, the step of cutting the shaft portion 338 of the intermediate work 336 so that the shaft portion 338 has a predetermined length is executed.

The present invention has been described with respect to the examples of the spindle motors and the method of manufacturing the same in accordance with the present invention. However, the present invention is not limited to these examples; other various modifications and changes can be made without departing from the scope of the invention.

What is claimed is:

1. A method of manufacturing a hub of a spindle motor for rotating a recording medium, comprising the steps of drawing or ironing a blank to form an intermediate work piece to be formed as a hub, the intermediate work piece having an end wall portion, a cylindrical portion extending from the outer circumferential end of the end wall portion substantially perpendicularly, and a flange portion extending from a free end of the cylindrical portion radially outwardly, and pressing a base portion of the flange portion to form an annular recess in the base portion after the step of forming the intermediate work, wherein the recording medium is placed on the surface of the flange in which the annular recess is formed.

2. A method according to claim 1, further comprising the step of forming a hole in the end wall portion after the step of forming the intermediate work, and thereafter burring the portion defining this hole to form a fixing annular projection on the end wall portion, wherein the rotating shaft of the spindle motor is fixed to the annular projection.

3. A method according to claim 2, further comprising the step of impacting a free end surface of the annular projection to make the free end surface flat after the step of burring, wherein when the rotating shaft is fixed to the annular projection, the free end surface made flat is brought into contact with an annular shoulder portion formed on the rotating shaft.

4. A method of manufacturing a hub of a spindle motor for rotating a recording medium, comprising the step of forging a blank into an intermediate work from which the hub is formed, said intermediate work having an end wall portion, a cylindrical portion extending from the outer circumferential end of the end wall portion substantially perpendicularly, and a flange portion extending from a free end of the cylindrical portion radially outwardly, and comprising an auxiliary forging step in which after the forging step, recesses for forming threaded holes for fixing a clamp member are formed in the end wall portion, and in which an annular recess is formed in a base portion of the flange portion.

5. A method according to claim 4, wherein an intermediate work is formed by the forging step, said intermediate work having the end wall portion, the cylindrical portion, the flange portion, and a shaft portion extending from the end wall portion substantially perpendicularly.

* * * * *